US006443518B1

(12) United States Patent
Röhl et al.

(10) Patent No.: US 6,443,518 B1
(45) Date of Patent: Sep. 3, 2002

(54) SEPARATION ARRANGEMENT FOR A SELF-SUSTAINED BODY STRUCTURE

(75) Inventors: Wolfgang Röhl, Sindelfingen; Jörg Sikorski, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/399,176

(22) Filed: Sep. 20, 1999

(30) Foreign Application Priority Data

Sep. 19, 1998 (DE) ......................................... 198 43 025

(51) Int. Cl.[7] ............................................. B60R 21/02
(52) U.S. Cl. .............. 296/203.01; 296/188; 296/203.04
(58) Field of Search ........................... 296/188, 203.01, 296/203.04

(56) References Cited

U.S. PATENT DOCUMENTS

| | | | |
|---|---|---|---|
| 3,661,419 A | | 5/1972 | Mitamura et al. |
| 4,950,025 A | * | 8/1990 | Yoshii ........................ 296/195 |
| 5,085,485 A | * | 2/1992 | Wurl ............................ 296/204 |
| 5,174,628 A | * | 12/1992 | Hayatsugu et al. .......... 296/188 |
| 5,176,403 A | * | 1/1993 | Klein et al. .................. 280/808 |
| 5,195,780 A | | 3/1993 | Inoue et al. |
| 5,580,121 A | * | 12/1996 | Dange et al. ................ 296/186 |
| 5,788,322 A | * | 8/1998 | Wolf et al. .................. 296/186 |
| 6,113,180 A | * | 9/2000 | Corporon et al. ....... 296/203.04 |

FOREIGN PATENT DOCUMENTS

DE  196 42 820  6/1997

* cited by examiner

*Primary Examiner*—Stephen T. Gordon
*Assistant Examiner*—Greg Blankenship
(74) *Attorney, Agent, or Firm*—Crowell & Moring, LLP

(57) ABSTRACT

A partition arrangement for a self-supporting body of a motor vehicle has a partition which is arranged at the forward end of a rear space and extends in the transverse direction of the vehicle and along a portion of its height between rear wheel houses of the motor vehicle. The arrangement is detachably fastened to boundary walls of the rear space. The partition extends along almost the entire height of the rear space and is arranged approximately in an upright transverse plane of the vehicle. The partition, moreover, is constructed as a supporting device stiffening the vehicle body against deformation.

2 Claims, 5 Drawing Sheets

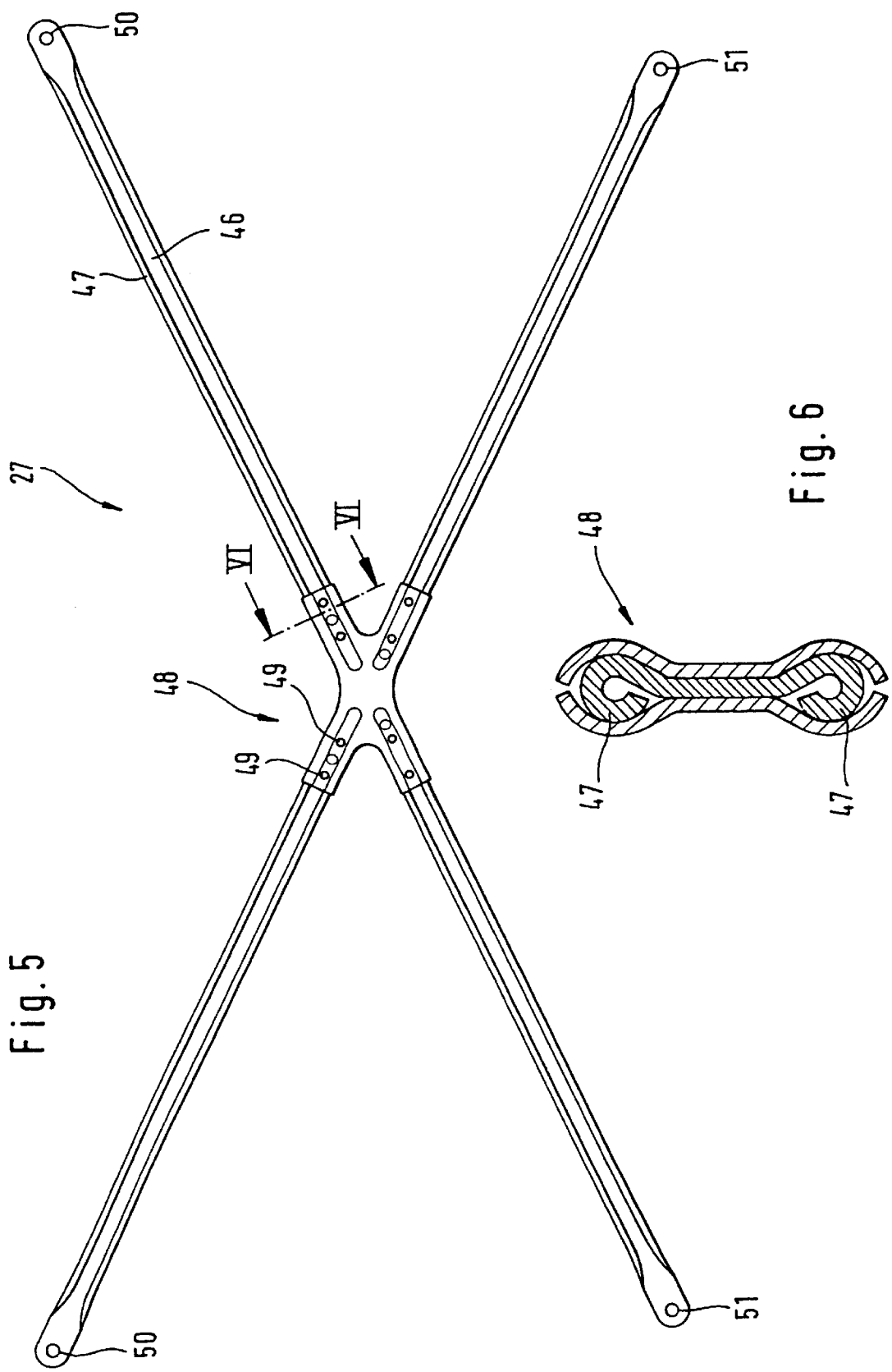

SEPARATION ARRANGEMENT FOR A SELF-SUSTAINED BODY STRUCTURE

This application claims the priority of German application 198 43 025.6-42, filed Sep. 19, 1998, the disclosure of which is expressly incorporated by reference herein.

BACKGROUND AND SUMMARY OF THE INVENTION

The present invention relates to a partition arrangement for a self-supporting body of a motor vehicle including a partition arranged on a forward end of a rear space, with the partition extending in a transverse direction of the vehicle as well as along a portion of its height between rearward wheel houses of the motor vehicle. The portion is detachably fastened to boundary walls of the rear space.

A partition arrangement of this type is known from the Mercedes-Benz Roadster SLK and has a rearward partition wall which is arranged at the forward end of a rear space. The rear space comprises a convertible top storage space and a trunk. The rearward partition wall extends in the transverse direction of the vehicle and approximately vertically, starting from a rear space floor, along a portion of its height between rear wheel houses, and then extends, in the upper area of the wheel houses, so as to be bent toward the front in the direction of a cross member. This cross member is arranged approximately at the level of the window ledges behind the two seats. A forward partition wall, which extends downward from the cross member behind the seats in the area behind the side doors and which is undetachably fastened to the self-supporting vehicle body, together with the rearward partition wall, bounds a space which is used for receiving the fuel tank. In order to be able to, for example, install and remove the fuel tank, the rearward partition wall is fastened in a detachable manner. In addition, the rearward partition wall in this partition arrangement is used particularly as the forward boundary of the rear space. It therefore includes a light aluminum sheet and does not result in a significant stiffening of the vehicle body.

It is an object of the invention to provide a partition arrangement for a self-supporting body of a motor vehicle of the type mentioned which causes an additional stiffening of the self-supporting vehicle body against deformation with low expenditures of material.

According to the invention, this object is achieved by a partition arrangement having a partition which extends along almost the whole height of the rear space, is arranged approximately in an upright transverse plane of the vehicle, and is constructed as a supporting device which stiffens the vehicle body against deformation.

In the partition arrangement according to the invention, the partition extends along almost the entire height of the rear space and is arranged in an approximately upright transverse plane of the vehicle. The partition is constructed as a supporting device which increases the stiffness against torsion and stiffens the vehicle body against deformation. In addition, the operating stability of the vehicle body is improved. As a result, in addition to bounding the rear space, the supporting device can provide stiffening of the self-supporting vehicle body as an additional function. Since the partition extends approximately in the transverse plane of the vehicle as mentioned above, the forces acting upon the supporting device can be absorbed very well and the stiffness against torsion of the vehicle body can be improved. Because the supporting device extends along almost the whole height of the rear space, the supporting device can be fastened very high on the wheel houses or on the side walls and the vehicle body can be stiffened along a large span of the height. In order to provide access to spaces situated in front of the supporting device, this supporting device is detachably fastened on the vehicle body by, for example, screwed connections.

Advantageous embodiments of the partition arrangement according to the invention with expedient further developments of the invention are described and claimed.

It was found to be advantageous to connect the damper domes arranged in the upper areas of the wheel houses with one another by a cross strut. As a result of the rear space floor situated on the bottom, the lateral wheel houses and the cross strut arranged at the top, a box-shaped structure of the vehicle body is created which can be stiffened very well by the supporting device. This box-shaped structure can additionally be stiffened by a carrying plate, which is fixedly connected with the cross strut and the damper domes.

Angular reinforcements, which are fastened on the bottom side of the carrying plate and on one damper dome respectively, provide not only a further stiffening of the box-shaped structure and of the vehicle body but also permit fastening of the supporting device at the top and the sides of the rear space.

A forward partition wall, which is arranged at the rearward end of the occupant compartment and is fastened to the carrier plate, is used not only for increasing the stiffness or resistance to torsion in a forward area of the box-shaped structure of the vehicle body but also to provide the boundary of a space, particularly for a fuel tank, by way of the rearward partition wall.

As a further development of the invention, it was found to be particularly advantageous to optionally mount a rearward partition wall or a partition frame as the supporting device. Instead of being equipped with a series-produced partition frame, the vehicle can, in a simple manner, be equipped with a rearward partition wall which can be used for receiving a ski bag. In this case, the partition wall can be fastened over large areas of the boundary walls of the rear space in order to permit a good force transmission.

Finally, it is particularly advantageous for the partition frame to include four straight struts which are detachably fastened on the angular reinforcements and in the corner areas between the wheel houses and a rear space floor. Here, it is advantageous for the mutually opposite struts to form straight diagonals which connect the angular reinforcements with the opposite corner areas along the shortest path and thus permit a good force transmission between the lateral upper and lower areas of the rear space.

Additional advantages, characteristics and details of the invention are apparent from the following description of preferred embodiments as well as from the drawings.

BRIEF DESCRIPTION OF THE DRAWINGS

FIG. 5 is a frontal view of a partition frame of the partition arrangement of the invention according to another embodiment; and FIG. 6 is an enlarged sectional view of the partition frame along Section line IV—IV in FIG. 5.

DESCRIPTION OF THE PREFERRED EMBODIMENTS

Figure 1:
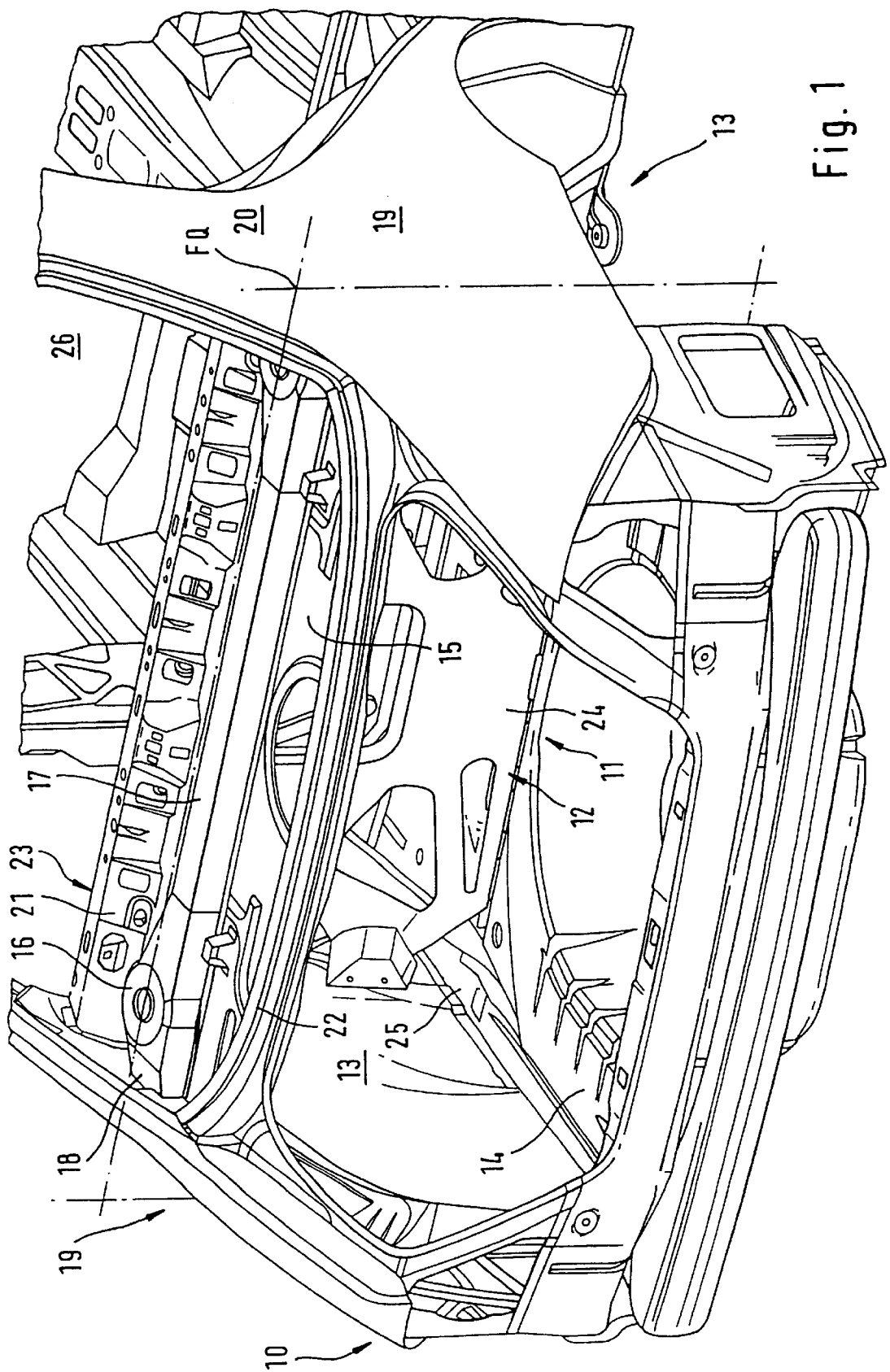
FIG. 1 is a perspective view of the rearward structure of a self-supporting vehicle body with a partition arrangement of the invention according to a preferred embodiment.

FIG. 1 is a perspective view of the rearward structure of a self-supporting vehicle body having a rear space 10 which, at its forward end 11, has a partition constructed as a supporting device 12. The supporting device 12 extends in an approximately vertical transverse plane FQ of the vehicle between rear wheel houses 13 and along the whole height of the rear space 10. This rear space is bounded on the bottom by a rear space floor 14 and on the top, at its forward end 11, by a carrying plate 15 for a rear window shelf which is not shown. The wheel houses 13, situated laterally in the area of the supporting device 12, comprise, in their upper areas, truncated-cone-shaped or approximately cylindrical damper domes 16 which are used for receiving chassis damping members. In this case, the damper domes 16 penetrate the carrying plate 15 at their upper ends and are fixedly connected with the plate. A cross strut 17 is also arranged between the upper ends of the damper domes 16. This cross strut 17 is fastened to the upper side of the carrying plate 15 and on the damper domes 16. The damper domes 16 and the cross strut 17 are situated in the transverse plane FQ of the vehicle. In addition, the cross strut 17 is extended, by two lateral struts 18, to the side walls 19 of the self-supporting vehicle body in the area of C-columns 20. The carrying plate 15 extends approximately horizontally and at a right angle with respect to the transverse plane FQ of the vehicle. The top side of the cross strut 17 and of the damper domes 16 is situated in a plane which preferably extends approximately at the level of the lower end of a rear window which is not shown. The carrier plate 15 is bounded by self-supporting forward and rearward carrier profiles 21, 22 which are also fastened on the side walls 19 of the self-supporting vehicle body in the areas of the C-columns 20. The rearward carrier profile 22 forms the lower end of the rear window and the transition area between the rear window and a rear space lid or trunk lid which is also not shown. The forward carrier profile 21 forms the upper end of a forward partition wall 23 which bounds the occupant compartment 26 toward the rear, extends in the transverse direction of the vehicle and in an upright position and, in addition to the forward carrier profile 21 of the carrying plate 15, is also fastened to the lateral walls 19 and to a vehicle compartment floor which is not shown. Together with the supporting device 12, the lateral walls 19 and the carrying plate 15, the forward partition wall 23 bounds a receiving space 36 which is used here for receiving a fuel tank. Each corner area between the wheel houses 13 and the rear space floor 14 is formed by a side member 25 extending in the longitudinal direction of the vehicle.

In the embodiment illustrated in FIG. 1, the supporting device 12 is constructed as a rearward partition wall 24 made of a magnesium diecasting which is detachably fastened laterally on the wheel houses 13, on the bottom on the rear space floor 14 and on the top on the carrying plate 15, for example, by screwed connections. As a result, the laterally arranged wheel houses 13 with the damper domes 16, the laterally arranged side walls 19, the rear space floor 14 and the carrier plate 15 form, together with the cross strut 17 fastened to the carrier plate 15 and the damper domes 16, a box-shaped structure of the self-supporting vehicle body. This structure is fixedly connected with the supporting device 12, and the supporting device, particularly the vehicle body, is constructed so as to be stiffened against deformation and increase the stability with respect to torsion of the vehicle body. A detailed description of the special method of operation and further developments of the supporting device 12 will be provided with reference to FIGS. 2 to 5.

Figure 2:
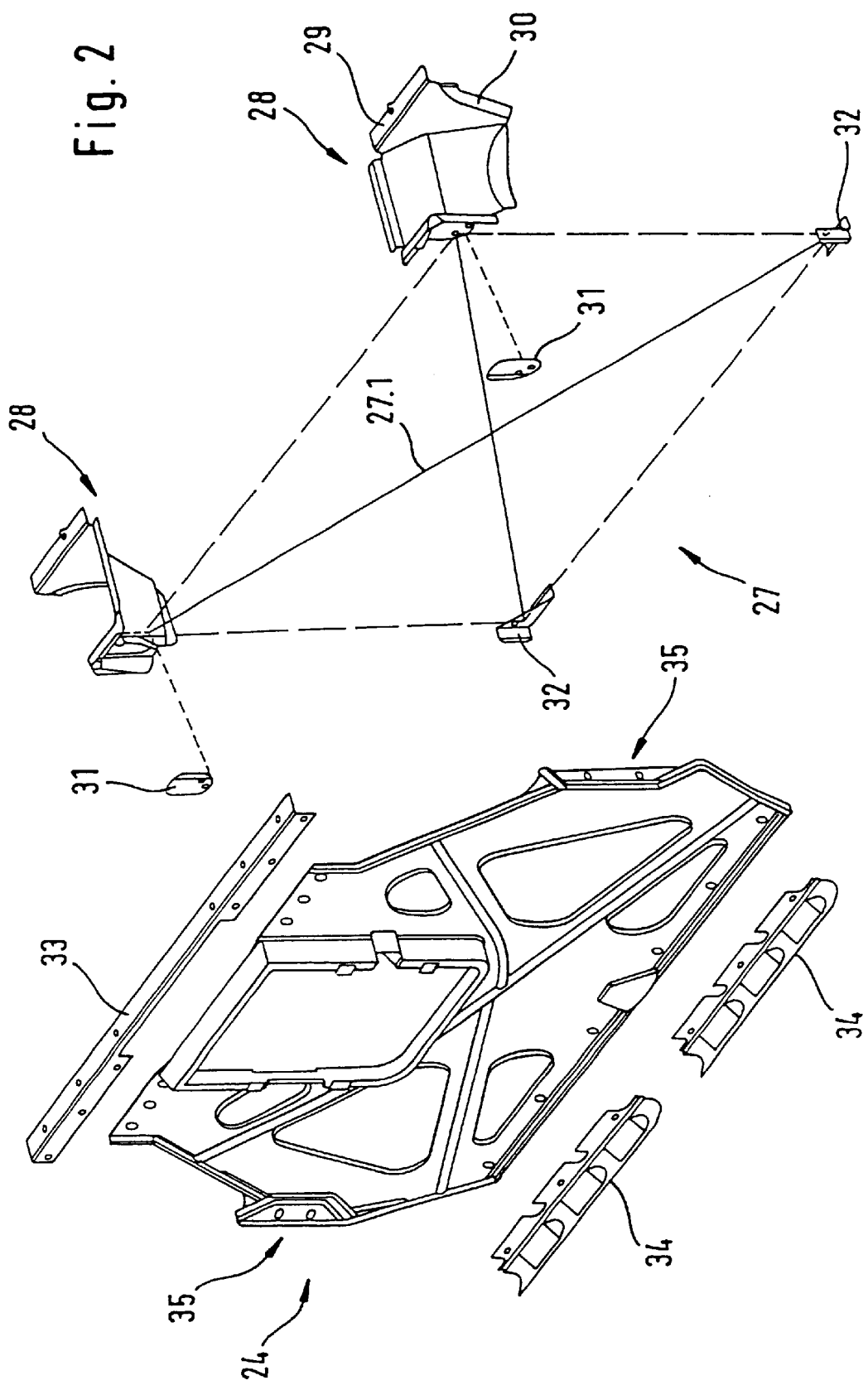
FIG. 2 is a perspective view of the fastening on a partition wall and of a partition frame, represented only by diagonals, of the partition arrangement of the invention according to a preferred embodiment.

FIG. 2 is a perspective diagonal view of the fastening of the partition wall 24 and of a partition frame 27 which is outlined only by diagonals 27.1. The partition frame 27, which is explained in detail particularly with reference to FIG. 5, is fixed in the upper area of the rear space 10 on angular reinforcements 28. On their upper ends 29, these reinforcements are fixedly connected with the carrier plate 15 and, on their lateral ends 30, the reinforcements are fixedly connected with the respective damper dome 16. The angular reinforcements 28 therefore provide an additional stiffening between the respective damper dome 16 and the carrier plate 15 with the cross strut 17.

For fastening the partition frame 27 to the angular reinforcements 28, upper holders 31 are used which are fixedly arranged on the angular reinforcements 28 and provide a receiving device, for example, for screws by which the partition frame 27 can be fixed on the angular reinforcements 28.

In the corner area between the side walls 19 and the rear space floor 14, lower holders 32 are provided. These lower holders are fastened to the respective lateral side member 25 and to the respective lateral wall 19. The partition frame 27 can be detachably fastened on the lower holders 32, for example, by screwed connections.

As an alternative to the partition frame 27, the rearward partition wall 24 illustrated in FIG. 1 can be used as the supporting device 12 or partition of the rear space 10. The rearward partition wall 24 is detachably fastened by an upper angular strip 33 and two lower angular strips 34 on the carrying plate 15 or on the rear space floor 14, for example, by screwed connections. In addition, the rearward partition wall 24 is detachably arranged in the area of lateral fastening sections 35 on the respective assigned wheel house 13.

Figure 3:
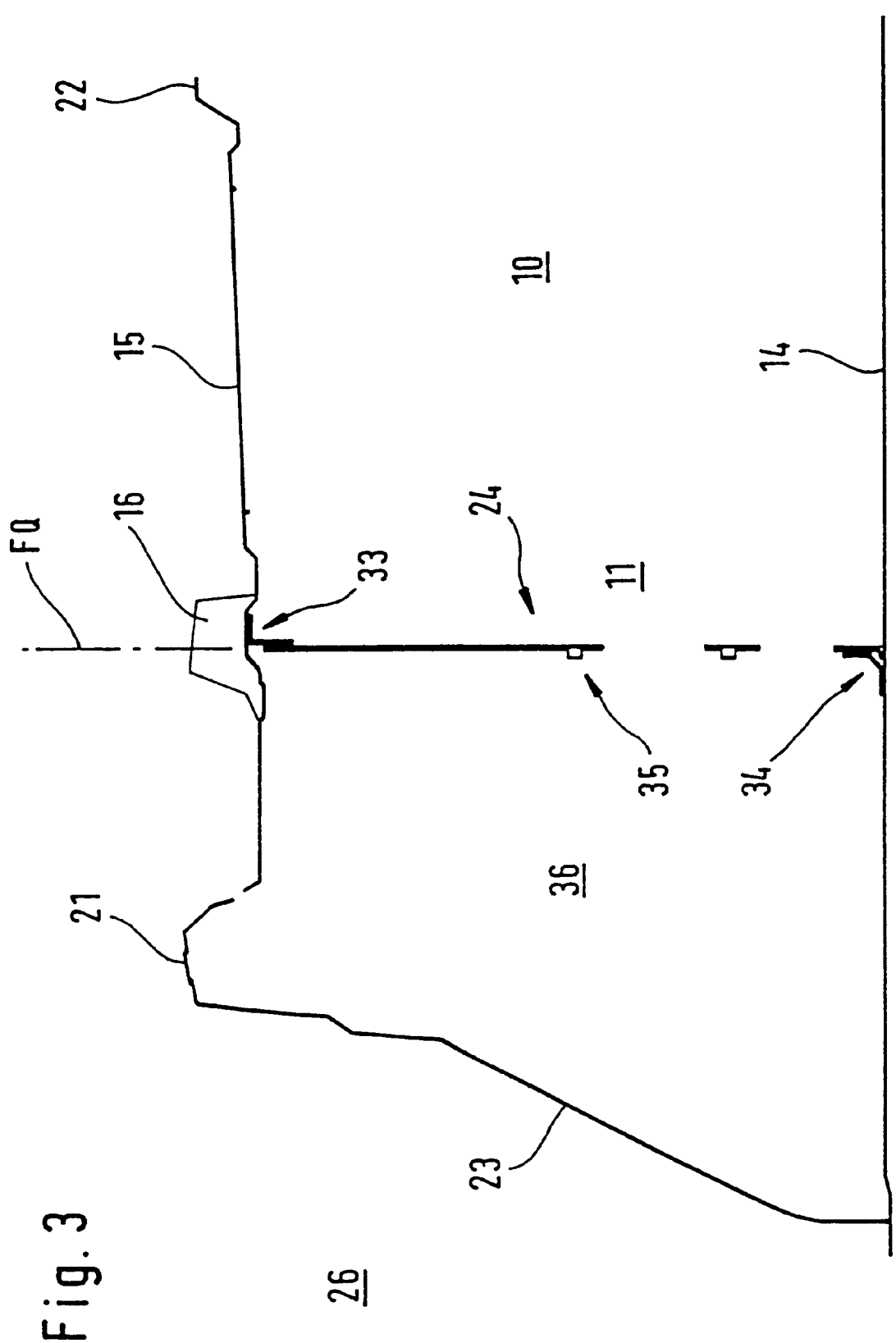
FIG. 3 is a schematic sectional view of the partition arrangement according to the invention along a sectional plane extending in the longitudinal direction of the vehicle.

FIG. 3 is a lateral schematic sectional view of. the rear space 10 along an intersection plane extending in the longitudinal direction of the vehicle. As illustrated, the partition wall 24 extending in the transverse plane FQ of the vehicle is arranged approximately vertically and the damper dome 16 is situated in the transverse plane FQ of the vehicle. The forward partition wall 23, which on the top is sloped slightly diagonally toward the rear, and the rearward partition wall 24 bound the receiving space 36. The carrier plate 15, on which the upper angular strip 33 is visible for fastening the partition wall 24, extends between the forward and the rearward carrier profile 21, 22. The lower angular strip 34 for fastening the partition wall 24 on the rear space floor 14 and the lateral fastening sections 35 for fastening the partition wall 24 on the wheel houses 13 are also indicated in FIG. 3.

Figure 4:
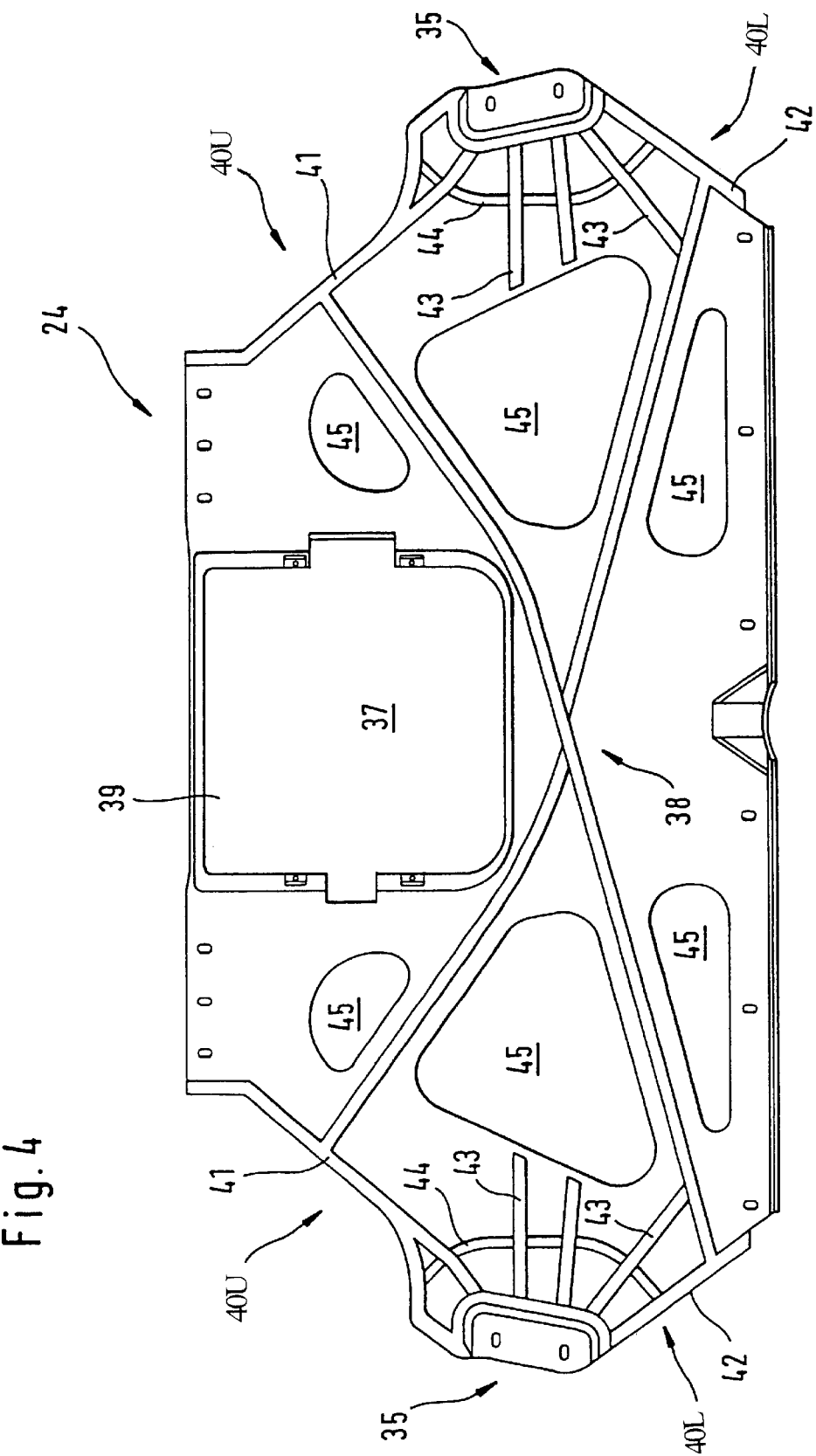
FIG. 4 is a frontal view of a partition wall of the partition arrangement of the invention according to a preferred embodiment.

FIG. 4 shows the partition wall 24 with a load-through opening 37 which is arranged centrally at the top and makes it possible to load items such as a ski bag. The load-through opening 37 can be closed, for example, by a swivel flap 39. Naturally, the forward partition wall 23 and the fuel tank are also provided with a corresponding opening in order to provide a load-through possibility from the rear space into the occupant compartment 26.

Lateral upper and lower areas 40U are correspondingly adapted to the contour of the angular reinforcements 28 or of the corner areas between the wheel house 13 and the rear space floor 14. A diagonal strut 38 is molded as a reinforcement to the partition wall 24, which diagonal strut 38 connects in each case the lateral upper area 40U with the opposite lateral lower area 40U. In the lateral upper area 39, two upper lateral struts 41 are molded to the partition wall 24. In the installed position of the partition wall 24, the lateral struts 41 surround the angular reinforcements 28 and connect the lateral fastening points of the upper angular strip 33 with the adjacent lateral fastening sections 35 on the wheel houses 13. Two lower lateral struts 42 extend between the lateral fastening points of the lower angular strips 34 and the adjacent lateral fastening sections 35. In the areas of the lateral fastening sections 35, additional struts 43, which point radially toward the inside, and struts 44 are provided which surround the lateral fastening sections 35 at a distance; these struts reinforce the partition wall 24. The diagonal strut 38 is connected with the lower lateral struts 42 and the upper lateral struts 41 and, therefore, provides a stiffening of the self-supporting vehicle body in the above-described manner. Between the struts 41–44, relief openings 46 penetrate the rearward partition wall 24 so as to permit good castability of the diecast magnesium plate and reduce weight. Boxes are provided along the top side and the bottom side of the rearward partition wall 24 as well as in the area of the lateral fastening sections for the screwed connections between the partition plate 24 and the upper and lower angular strips 33, 34 as well as the wheel houses 13.

FIG. 5 illustrates the partition frame 27 which comprises four straight lock-beaded struts 46 which—as illustrated in FIG. 6—have an approximately C-shaped cross-section with reinforcements 47 laterally bent at right angles. The struts 46 can be adjusted and fastened in a centrally arranged frame cross 48 which is formed by two parts surrounding the struts 46. Adjustability and mountability is achieved by screwed connections 49, by which the struts 46 arranged between the two parts of the frame cross 48 can be braced and released.

At their ends facing away from the frame cross 48, the struts 46 are widened in a flat manner and have upper and lower bores 50, 51 by which the partition frame 27 can be detachably fastened on the angular reinforcements 28 and in each corner area between the respective wheel house 13 and the rear space floor 14. The mutually opposite struts 45 are mutually connected by the frame cross 48 such that they connect, on the shortest path, the angular reinforcements 28 with the opposite corner areas and thus form a straight diagonal which is particularly suitable for stiffening the vehicle body. In addition, this diagonal is arranged particularly close to the top and bottom of the sides of the rear space 10 in order to achieve particularly good stiffening characteristics.

A covering, which is made of a plastic material with a carpet cover and which is not shown, is arranged on the rearward partition wall 24 or the partition frame 27. The partition wall 24 or the partition frame 27 can be covered by the covering with respect to the rear space 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Partition arrangement for a self-supporting vehicle body of a motor vehicle comprising:

a partition arranged on a forward end of a rear space, which partition extends in a transverse direction of the vehicle as well as along a portion of its height between rearward wheel houses of the motor vehicle and is detachably fastened to boundary walls of the rear space, wherein the partition extends almost entirely along a height of the rear space, is arranged approximately in an approximately upright transverse plane of the vehicle, and is constructed as a supporting device which stiffens the vehicle body against deformation, wherein, in upper areas of the rearward wheel houses, damper domes are connected with one another by a cross strut, the damper domes and the cross strut being situated in the approximately upright transverse plane of the vehicle, and a carrier plate fixedly connected with the cross strut and the damper domes, said carrier plate extending approximately horizontally and at a right angle with respect to the approximately upright transverse plane of the vehicle, wherein the cross strut has two angular reinforcements fixed on an underside of the carrier plate and on one of the damper domes respectively, wherein a partition frame can be mounted as the supporting device, and wherein the partition frame comprises four straight struts which can be adjusted and fastened in a centrally arranged frame cross.

2. Partition arrangement according to claim 1, wherein the four straight struts are opposite struts which form straight diagonals connecting the angular reinforcements with opposite corner areas along the shortest path.

* * * * *